United States Patent Office 2,721,864
Patented Oct. 25, 1955

2,721,864

DISAZO AND POLYAZO DYESTUFFS

Philippe Grandjean, Basel, and Walter Wehrli, Riehen, Switzerland, assignors to Sandoz A. G., Basel, Switzerland, a Swiss firm No Drawing. Application March 2, 1953,
Serial No. 339,896

Claims priority, application Switzerland March 7, 1952

6 Claims. (Cl. 260—173)

The present invention relates to new disazo and polyazo dyestuffs and to the preparation thereof.

Dyestuffs which yield yellow, orange and brown shades in textile dyeings are known. However, such dyestuffs, when they are characterized by good fastness to light, are frequently bound up with poor dischargeability or, when their dischargeability is good, suffer from poor fastness to light. Their dyeings are frequently also impaired by treatments incidental to creaseproofing.

A primary object of the present invention is the embodiment of a new series of dyestuffs of the said class—yellow, orange, red-brown and brown—which are characterized by the fact that, in addition to the purity of shade of the dyeings produced therewith, such dyeings possess both good fastness to light and good dischargeability, and are also unimpaired by creaseproofing treatments.

This and other objects which will hereinafter appear are realized by the present invention according to which, briefly stated, the desired dyestuffs are prepared by condensing two mols of an aminoazo compound of the formula:

(I)   $R_1$—azo—$R_2$—X—$NH_2$ wherein $R_1$ stands for a radical of the pyrene series, $R_2$ stands for a radical of the benzene series, X stands for a simple bond or one of the bridge groupings:

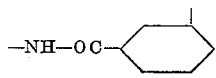

and

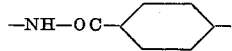

which groupings may be further substituted, and wherein —azo— and —X—$NH_2$ are in para-position with respect to each other, with one mol of a dicarboxylic acid halide of the formula:

(II)   Z—OC—C=CH—CO—Z
              |
              A wherein each Z stands for Cl or Br, and A stands for H, Cl, Br or $CH_3$.

Alternatively, one mole of a dicarboxylic acid halide of Formula II may be condensed with two mols of a mixture, composed as desired, of aminoazo compounds of Formula I, or with two mols of a mixture, composed as desired, of an aminoazo compound of Formula I and of a non-metallizable aminomonoazo or aminodisazo compound of any desired composition.

In each case, however, the reactants must be so selected that the resultant disazo or polyazo dyestuff contains a sufficient number of solubilizing groups, such as —$SO_3H$ and/or —COOH, to assure water-solubility thereof.

The joining together of the two molecules of the aminoazo compound or of the mixture of aminoazo compounds by means of the dicarboxylic acid halide takes place preferably at room temperature (about 20° C.) in a weakly acid (acetic acid), neutral or alkaline aqueous solution. The liquid dicarboxylic acid halide or a solution thereof in an organic solvent is added to the dissolved aminoazo compound or compounds—an acid-binding agent such for example as an alkali metal hydroxide, an alkali metal carbonate, an alkaline earth metal oxide, an alkaline earth metal carbonate, an alkali metal acetate, or a suitable organic tertiary amine such as N,N-dimethylaminobenzene, being added at the beginning or during the course of the reaction.

Suitable dicarboxylic acid halides of Formula II comprise the dichlorides and dibromides of fumaric acid, maleic acid, methylfumaric acid, methylmaleic acid, chlorofumaric acid and bromofumaric acid.

The new disazo or polyazo dyestuffs, correspond to the general formula $$R-OC-CH=C-CO-R$$
$$\phantom{R-OC-CH=}|$$
$$\phantom{R-OC-CH=}A$$

wherein A stands for H, Cl, Br or $CH_3$, one R stands for the grouping:

(III)   $R_1$—azo—$R_2$—X—NH— and the other R stands for the identical Grouping III or for the grouping:

(IV) $(R_3$—N=N—$)_{n-1}R_4$—N=N—$R_5$—X—NH—

In the foregoing Formulae III and IV, X may be a simple bond or may be one of the bridging radicals, substituted or unsubstituted, of the formulae:

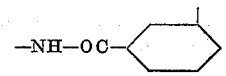

and

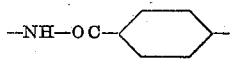

n is one of the integers 1 and 2, $R_1$ is a radical of the pyrene series, $R_2$ is a radical of the benzene series which may be substituted by lower alkyl (e. g. methyl, ethyl, propyl, butyl, etc.), lower alkoxy (e. g. methoxy, ethoxy, propoxy, etc.), or acylamino (e. g. acetylamino, propionylamino, etc.), and each of $R_3$, $R_4$ and $R_5$ is a radical of the benzene or of the naphthalene series which may be substituted by halogen (e. g. Cl, Br, etc.), lower alkyl, lower alkoxy, acylamino or nitro. Moreover, the dyestuffs must comprise a total of at least three solubilizing (e. g. $SO_3H$ and/or COOH) groups.

The said new dyestuffs according to the present invention dye cotton and fibers of regenerated cellulose in yellow, orange, red-brown and brown shades. The dyeings are distinguished by their high fastness to light and by their generally very good dischargeability. They are very stable to creaseproofing treatments. In those cases where the aminoazo components employed are not identical, the products comprise a mixture of asymmetrical dyestuff with the corresponding two symmetrical dyestuffs.

The following examples illustrate the invention, but the latter is not intended to be restricted to the particular condensation conditions recited therein. In these examples, the parts are by weight.

*Example 1*

495 parts of the aminoazo compound prepared by coupling diazotized 3-aminopyrenedisulfonic acid (which may be in the form of a mixture of 3-aminopyrene-5,8-disulfonic acid and 3-aminopyrene-5,10-disulfonic acid, obtained in known manner by sulfonating 3-aminopyrene) with 1-amino-3-methylbenzene, are dissolved in water at room temperature, neutrality being maintained by the addition of aqueous sodium hydroxide solution. Into the thus-obtained solution, there are simultaneously added, dropwise and while stirring thoroughly, a solution of 76.5 parts of fumaric acid dichloride and 80 parts of benzene as well as a sufficient quantity of aqueous sodium carbonate solution to maintain the reaction weakly alkaline throughout. After all the fumaric acid dichloride has been added, stirring of the solution is continued until no free amino group is detectable. Thereupon the resultant new dyestuff is separated from the warm solution with the aid of sodium chloride, after which it is filtered off and dried. It corresponds to the formula

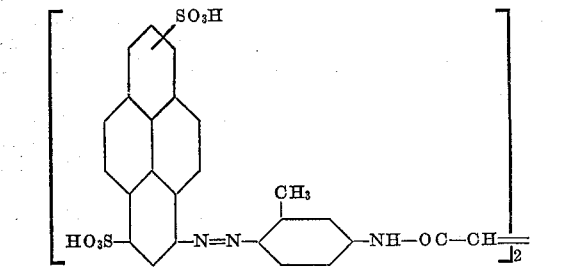

and is a brownish yellow powder which dyes cotton and fibers of regenerated cellulose in reddish yellow shades of good dischargeability and outstanding fastness to light.

Dyestuffs with similar properties are obtained when, while otherwise proceeding according to the foregoing paragraph, the 1-amino-3-methylbenzene in the starting aminoazo compound is replaced by other amines of the benzene series, as for example by aminobenzene, 1-amino-2-methylbenzene, 1-amino-3-ethylbenzene, 1-amino-2,5-dimethylbenzene, 1-amino-3-formylaminobenzene, 1-amino-3-acetylaminobenzene, 1-amino-3-propionylaminobenzene, 1-amino-3-benzoylaminobenzene, 1-amino-2-ethoxybenzene, 1-amino-2-ethoxybenzene, 1-amino-3-methoxybenzene, 1-amino-2-methoxy-5-methylbenzene, 1-amino-2-methoxy-5-acetylaminobenzene, 1-amino-2,5-dimethoxybenzene or 1-amino-2,5-diethoxybenzene. In the case, for example, of 1-amino-2-methoxy-5-methylbenzene, the resultant dyestuff corresponds to the formula

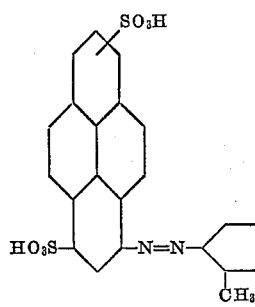

If the fumaric acid dichloride is replaced by fumaric acid dibromide, the identical dyestuff is obtained in each of the described instances.

Example 2

254.5 parts (0.5 mol) of the aminoazo compound prepared by coupling diazotized 3-aminopyrenedisulfonic acid with 1-amino-2,5-dimethylbenzene and 262.5 (0.5 mol) of the aminoazo compound prepared by coupling diazotized 3-aminopyrenedisulfonic acid with 1-amino-2-methoxy-5-methylbenzene are together dissolved in water, neutrality being maintained by the addition of an aqueous sodium hydroxide solution, after which condensation is carried out according to the data of Example 1 with 76.5 parts (0.5 mol) of fumaric acid dichloride. After isolation, the resultant dyestuff mixture is a reddish yellow powder and dyes cotton and fibers of regenerated cellulose in orange shades of very good dischargeability and fastness to light. The asymmetrical component thereof corresponds to the formula

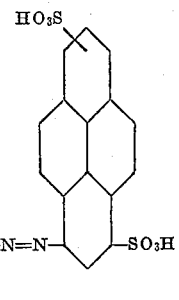

Dyestuffs of similar properties are obtained when, in the starting aminoazo compounds, the 1-amino-2,5-dimethylbenzene and/or the 1-amino-2-methoxy-5-methylbenzene are/is replaced by one of the amines enumerated in Example 1, provided that the two starting dyestuffs are not identical.

If the two mixture components are condensed in other mol relationships with fumaric acid dichloride, as for example in the proportion of 0.4:0.6 or 0.75:0.25, the products are more reddish or more yellowish dyestuffs with equally good properties.

If the fumaric acid dichloride is replaced by maleic acid dichloride or maleic acid dibromide or by methylfumaric acid dichloride or methylfumaric acid dibromide, cotton dyestuffs of similar properties are obtained.

Example 3

614 parts of the aminoazo compound, obtained by coupling diazotized 3-aminopyrenedisulfonic acid with 1-amino-3-methylbenzene, condensing the resultant intermediate with 4-nitrobenzoyl chloride, and then reducing the nitro group to the amino group, are dissolved in water at room temperature, neutrality being maintained by the addition of aqueous sodium hydroxide solution, after which condensation is carried out according to the data of Example 1 with 76.5 parts of fumaric acid dichloride. After isolation, the resultant disazo dyestuff is a yellow-brown powder, which corresponds to the formula

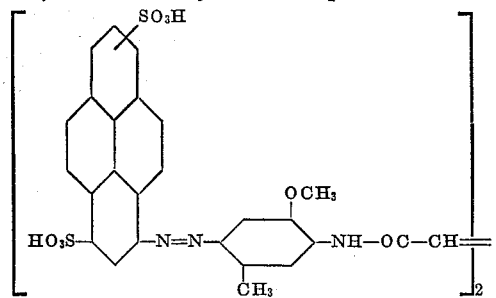

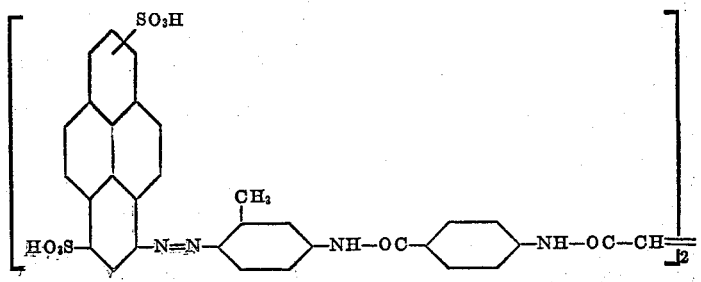

and dyes cotton and fibers of regenerated cellulose in golden yellow shades of excellent light-fastness.

Dyestuffs of similar properties are obtained when, in the starting aminoazo compound, on the one hand the 1-amino-3-methylbenzene is replaced by one of the amines of the benzene series enumerated in Example 1 and/or, on the other hand, the 4-aminobenzoyl group is replaced by the 4-amino-3-methylbenzoyl group or the 3-aminobenzoyl group or the 3-amino-4-methoxybenzoyl group.

Example 4

313 parts (0.5 mol) of the aminoazo compound, obtained by coupling diazotized 3-aminopyrenedisulfonic acid with 1-amino-2,5-dimethylbenzene, condensing the resultant intermediate with 3-nitrobenzoyl chloride, and then reducing the nitro group to the amino group, and 262.5 parts (0.5 mol) of the aminoazo compound pre-

Example 5

262.5 parts (0.5 mol) of the aminoazo compound prepared by coupling 3-aminopyrenedisulfonic acid with 1-amino-2-methoxy-5-methylbenzene and 225.5 parts (0.5 mol) of the aminoazo compound prepared by coupling diazotized 2-aminonaphthalene-6,8-disulfonic acid with 1-amino-2-methoxy-5-methylbenzene are dissolved in water with the addition of aqueous sodium hydroxide solution, after which condensation is carried out according to the data of Example 1 with 76.5 parts (0.5 mol) of fumaric acid dichloride. After isolation, the resultant dyestuff mixture is a red-brown powder, which dyes cotton and fibers of regenerated cellulose in orange shades of excellent dischargeability and light-fastness. The asymmetrical component corresponds to the formula

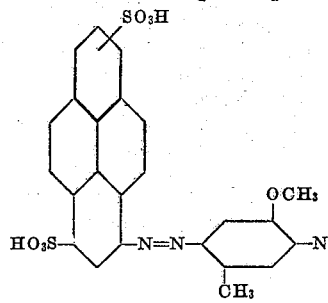

pared by coupling diazotized 3-aminopyrenedisulfonic acid with 1-amino-2-methoxy-5-methylbenzene are together dissolved neutral in water with the addition of aqueous sodium hydroxide solution, after which condensation is carried out according to the data of Example 1 with 76.5 parts (0.5 mol) of fumaric acid dichloride. After isolation thereof, the resultant dyestuff mixture is an orange powder which dyes cotton and fibers of regenerated cellulose in orange shades of very good fastness to light. The asymmetrical component corresponds to the formula

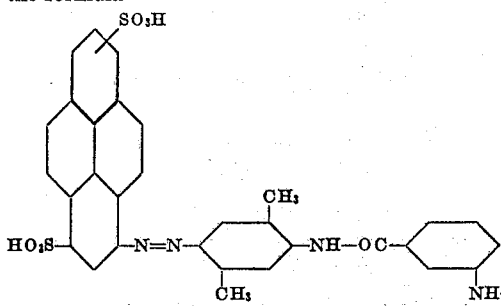

Dyestuffs of similar properties are obtained when, on the one hand, the 3-aminobenzoyl group in the first component of the mixture is replaced by the 4-aminobenzoyl group or the 4-amino-3-methylbenzoyl group or the 3-amino-4-methoxybenzoyl group and/or, on the other hand, the second component of the mixture is replaced by one of the aminoazo compounds mentioned in Example 1.

Dyestuffs of similar properties are obtained when, on the one hand, the 3-aminopyrenedisulfonic acid in the first component of the mixture is replaced by 3-aminopyrene-4-monosulfonic acid or by 3-aminopyrene-8-monosulfonic acid or by 3-aminopyrene-10-monosulfonic acid and/or the 1-amino-2-methoxy-5-methylbenzene by one of the amines of the benzene series mentioned in Example 1 and/or, on the other hand, in the second component of the mixture, the 2-aminonaphthalene-6,8-disulfonic acid is replaced by 2-aminonaphthalene-4,8-disulfonic acid or by 2-aminonaphthalene-5,7-disulfonic acid and/or the 1-amino-2-methoxy-5-methylbenzene by one of the amines of the benzene series enumerated in Example 1. The dye with 3-aminopyrene-4-monosulfonic acid and 2-aminonaphthalene-4,8-disulfonic acid corresponds to the formula

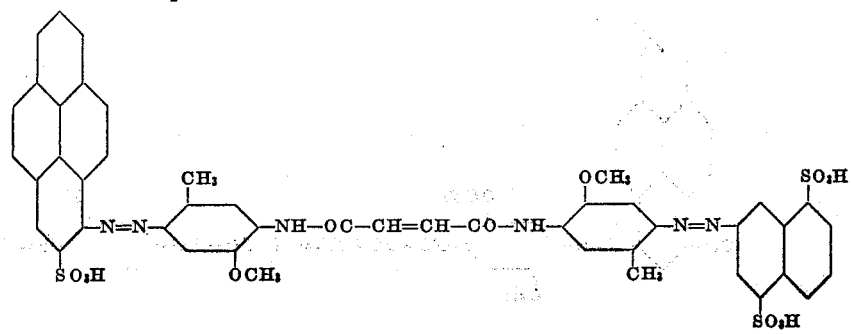

Example 6

254.4 parts (0.5 mol) of the aminoazo compound pre-

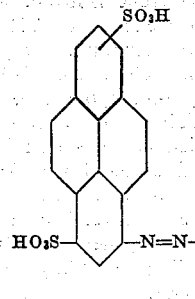

pared by coupling diazotized 3-aminopyrenedisulfonic acid with 1-amino-2,5-dimethylbenzene and 237.5 parts (0.5 mol) of the aminoazo compound prepared by coupling diazotized 4'-amino-1,1'-azobenzene-3',4-disulfonic acid with 1-amino-3-methylbenzene are dissolved in water with the addition of sodium hydroxide, after which condensation is carried out according to the data of Example 1 with 76.5 parts (0.5 mol) of fumaric acid dichloride. After isolation, the resultant dyestuff mixture is an orange-brown powder which dyes cotton and fibers of regenerated cellulose in brownish orange shades of excellent dischargeability and fastness to light. The asymmetrical compound thereof corresponds to the formula

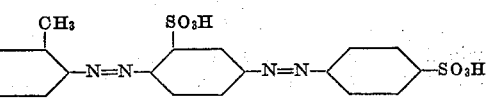

Dyestuffs with similar properties are obtained when, on the one hand, the first mixture component is replaced by one of the aminoazo or aminobenzoylaminoazo compounds enumerated in Examples 1 and 3 and/or, on the other hand, the second mixture component is replaced by any other desired non-metallizable aminoazo compound. The following table exemplifies a representative number of the numerous possible variations, the procedure in each case being analogous to that set forth in the preceding examples:

| Example No. | First Mixture Component | Second Mixture Component | Shade on Cotton and Fiber of Regenerated Cellulose. |
|---|---|---|---|
| 7 | 3-aminopyrenedisulfonic acid ⟶ 1-amino-2-methoxy-5-methylbenzene. | 4'-amino-1,1'-azobenzene-3',4-disulfonic acid ⟶ 1-amino-3-methylbenzene, condensed with 4-nitrobenzoyl chloride and reduced to the aminobenzoylamino-disazo compound. | orange. |
| 8 | do | 2-aminonaphthalene-6,8-disulfonic acid ⟶ aminobenzene ⟶ 1-amino-3-methylbenzene. | reddish orange. |
| 9 | 3-aminopyrenedisulfonic acid ⟶ 1-amino-2-methoxy-5-acetylaminobenzene. | 2-aminonaphthalene-4,8-disulfonic acid ⟶ 1-amino-3-methylbenzene ⟶ 1-amino-2-methoxy-5-methylbenzene. | red. |
| 10 | 3-aminopyrenedisulfonic acid ⟶ 1-amino-2,5-dimethylbenzene. | 4'-amino-1,1'-azobenzene-3',4-disulfonic acid condensed with 4-nitrobenzoyl chloride and reduced to the aminobenzoylaminoazo compound. | reddish yellow. |
| 11 | 3-aminopyrenedisulfonic acid ⟶ 1-amino-3-methylbenzene. | 2-aminonaphthalene-4,8-disulfonic acid ⟶ 1-amino-3-methylbenzene ⟶ 1-amino-3-methylbenzene. | yellowish orange. |
| 12 | 3-aminopyrenedisulfonic acid ⟶ 1-amino-2-methoxy-5-methylbenzene. | 4'-amino-1,1'-azobenzene-3',4-disulfonic acid ⟶ 2-amino-5-hydroxynaphthalene-7-sulfonic acid. | orange-red. |
| 13 | 3-aminopyrenedisulfonic acid ⟶ 1-amino-2-methyoxybenzene. | 1-aminobenzene-4-sulfonic acid ⟶ 1-aminonaphthalene-7-sulfonic acid ⟶ 1-amino-3-methylbenzene. | orange-brown. |
| 14 | 3-aminopyrenedisulfonic acid ⟶ 1-amino-3-methylbenzene. | 1-amino-2,4-dichlorobenzene-6-sulfonic acid ⟶ 1-aminonaphthalene-6-sulfonic acid ⟶ aminobenzene. | yellow-brown. |
| 15 | do | 1-amino-4-bromobenzene-2-sulfonic acid ⟶ 1-aminonaphthalene-6-sulfonic acid ⟶ 1-amino-2-methoxy-5-formylaminobenzene. | red-brown. |
| 16 | do | 1-amino-2-carboxybenzene-5-sulfonic acid ⟶ 1-aminonaphthalene ⟶ 1-amino-3-benzoylaminobenzene. | yellow-brown. |

The asymmetrical compound of the dye mixture obtained according to Example 8 corresponds to the formula

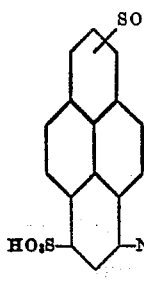
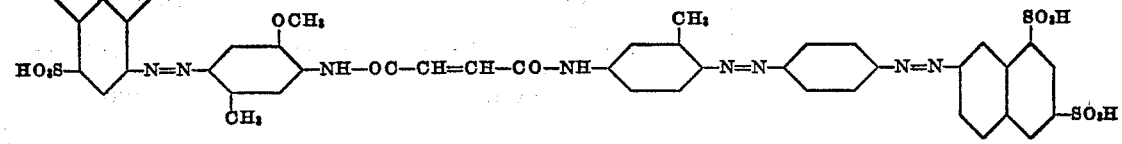

and that according to Example 10 corresponds to the formula

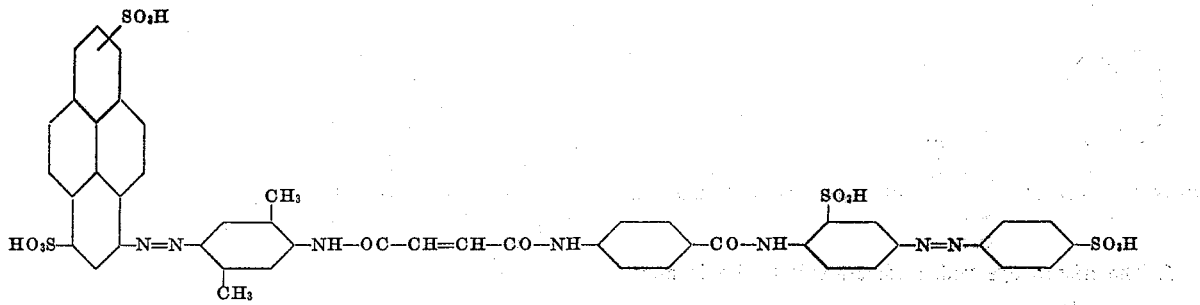

The acid-binding agents employed in the foregoing examples can, without prejudicing the process, be replaced by for example sodium hydroxide, potassium hydroxide, sodium acetate, potassium acetate, potassium carbonate, magnesium oxide, calcium carbonate or N,N-dimethylaminobenzene.

In those cases where fumaric acid dichloride is employed, it may be replaced by fumaric acid dibromide, identical condensation products being obtained in each case. Similar dyestuffs are obtained upon replacement of the fumaric acid dichloride by chlorofumaric acid dichloride or bromofumaric acid dichloride or by the corresponding dibromide.

Example 17

100 parts of cotton are entered at 80° into a dyebath which contains 1 part of anhydrous sodium carbonate, 0.5 part of the dyestuff obtainable according to Example 2 and 2000 parts of water. The dyebath is heated slowly to boiling, after which 20 parts of anhydrous sodium sulfate are added and the mixture allowed to cool slowly to about 70°. The material is removed, rinsed with cold water and then dried. An orange dyeing is obtained which has good fastness to washing and excellent light-fastness and dischargeability. It tolerates creaseproofing treatments very well.

In similar manner, dyeings may be obtained with the dyestuffs of the other examples.

Having thus disclosed the invention what is claimed is:

1. Dis- and polyazo dyestuffs which correspond to the formula $$R-OC-CH=C-CO-R$$
$$\quad\quad\quad\quad\quad\;\;|$$
$$\quad\quad\quad\quad\quad\;\;A$$

wherein A stands for a member selected from the group consisting of hydrogen, chlorine, bromine and methyl, one R stands for the radical of the formula $$R_1-azo-R_2-X-NH-$$

and the other R stands for a member selected from the group consisting of radicals of the formulae $$R_1-azo-R_2-X-NH-$$

and $(R_3-N=N-)_{n-1}R_4-azo-R_5-X-NH-$, wherein —azo— and —X—NH— stand in para-position to each other, X stands for a member selected from the group consisting of a simple linkage, and of the radicals

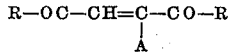

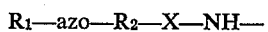

and

radicals, $n$ is one of the integers 1 and 2, $R_1$ stands for a radical of the pyrene series, $R_2$ stands for a member selected from the group consisting of phenyl, lower alkyl-substituted phenyl, lower alkoxy-substituted phenyl and carboxyacylaminophenyl, each of $R_3$, $R_4$ and $R_5$ stands for a member selected from the group consisting of unsubstituted and substituted phenyl and naphthyl radicals, the substituents being chosen from the group consisting of chlorine and bromine atoms, lower alkyl, lower alkoxy, carboxyacylamino and nitro groups, said dyestuffs containing at least three water-solubilizing groups selected from the class consisting of sulfonic acid and carboxylic acid groups.

2. The disazo dye which corresponds to the formula

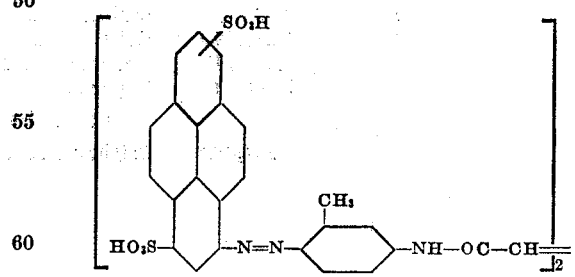

3. The disazo dye which corresponds to the formula

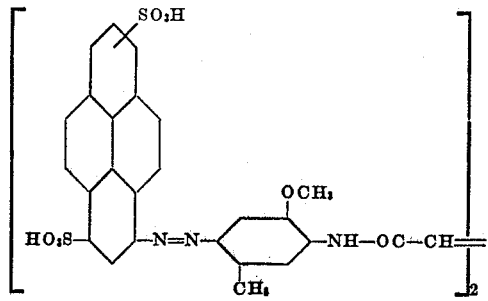

4. The disazo dye which corresponds to the formula
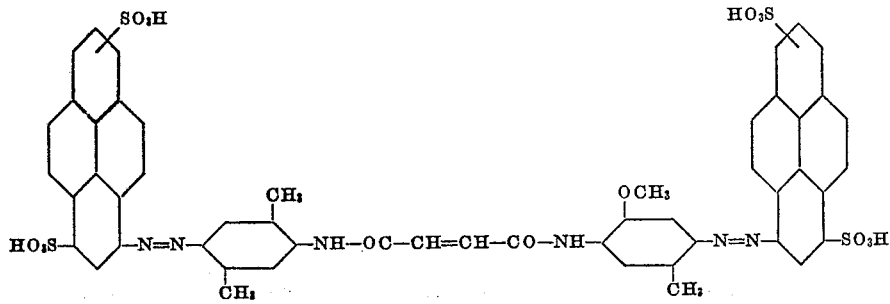
5. The trisazo dye which corresponds to the formula
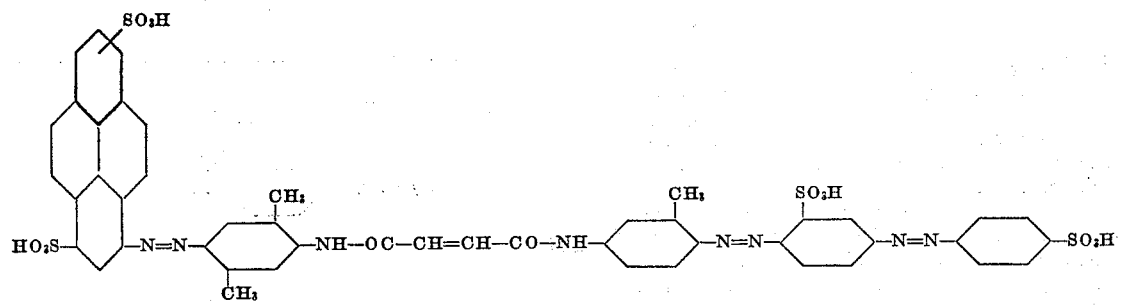
6. The disazo dye which corresponds to the formula
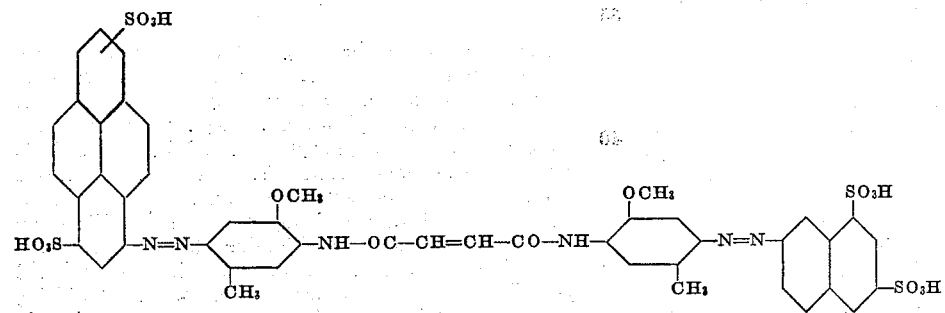
References Cited in the file of this patent
UNITED STATES PATENTS
| | | |
|---|---|---|
| 2,104,595 | Schirm | Jan. 4, 1938 |
| 2,212,590 | Delfs | Aug. 28, 1940 |
| 2,617,797 | Anderau | Nov. 11, 1952 |
| 2,646,338 | Kappeler et al. | July 21, 1953 |
FOREIGN PATENTS
| | | |
|---|---|---|
| 504,489 | Belgium | July 31, 1951 |